Dec. 20, 1960 S. G. NEVIUS 2,965,860

FLAT PHASE NETWORK

Filed Nov. 1, 1957 2 Sheets-Sheet 1

INVENTOR.
SEARLE G. NEVIUS

BY R. E. Geaugue

Attorney

INVENTOR.
SEARLE G. NEVIUS

BY R. E. Geauque
Attorney

United States Patent Office 2,965,860

Patented Dec. 20, 1960

2,965,860

FLAT PHASE NETWORK

Searle G. Nevius, Tujunga, Calif., assignor to Telecomputing Corporation, North Hollywood, Calif., a corporation of California Filed Nov. 1, 1957, Ser. No. 693,979

16 Claims. (Cl. 333—70)

This invention relates to electrical phase correction circuits and more particularly to novel four-terminal networks which provide precisely controlled phase characteristics over a reasonably wide frequency band width and which are particularly well adapted for use in systems where the intelligence is in the phase domain.

The lag in phase of a signal through a conventional RC integrating network (low-pass filter) increases as the frequency increases. Similarly, the lead in phase of a signal through a conventional differentiating network (high-pass filter) decreases with an increase in frequency. Thus, both change in a lagging direction with increasing frequency, the time-of-transmission through the filter being proportional to the slope of the phase versus frequency characteristics.

It is accordingly a major object of the present invention to provide a novel circuit having a substantially constant time delay, as well as a substantially constant amplification, over the desired pass band.

Another object of the invention is to provide a four-terminal network capable of producing substantially zero relative phase shift between different signal frequencies in a narrow pass band for use in circuits where the intelligence is in a phase domain.

A prior circuit used in an effort to attain a positive phase shift between frequencies in the circuit of a radar antenna servo employed two series resistances across the input terminal with a capacitance in parallel with one of the resistances. The output was taken from a common terminal at the end of the other resistance and at the junction between the two resistances. At zero input frequency or the cut-off frequency, the amplitude of the output of this circuit was some finite minimum value whereas at infinite frequency, the capacitance in parallel with the first resistor had zero reactance and therefore appeared as a short circuit causing the upper finite limit of amplitude to be reached. This positive amplitude curve was accompanied by a first positive rising phase change at zero frequency, a maximum positive phase change at some intermediate amplitude position, and a zero phase change at infinite frequencies thus giving a bell-shaped curve which if superimposed on the amplitude versus frequency curve would overlay the S-shaped curve of the amplitude characteristic. In that circuit there was a band of frequencies at which a positive slope in the curve of the amplitude change was accompanied by a positive slope in the curve of the phase change. In other words, such a circuit provided positive phase characteristics but with a positive change in the amplitude as the frequency increased. It should be noted also that the positive-going section of the bell curve was asymmetrical as there was no center point in the positive portion of the slope.

Disadvantages of prior circuit include the positive change in amplitude with an increase in frequency, the lack of symmetry over the frequency band in that region where the curve of the phase shift versus frequency had a positive slope, and the high insertion loss of this type of circuit.

It is a further major object of this invention to provide a novel circuit obviating the undesirable characteristics just enumerated, in that the insertion losses are much lower, the positive slope of the curve of the phase shift versus frequency is substantially symmetrical, and successive cascaded stages are not required in order to obtain adequate degrees of positive phase shift relative to input current to provide a flat phase output signal over a desired pass band.

Still another object of the invention is to provide a four-terminal network having two sections, one being conventional with a phase versus frequency curve having a negative slope and the other section with a similar curve having a corresponding positive slope thereby providing a precisely controlled relative phase shift of signal frequencies in the pass band.

A further object of the invention is to provide an over-coupled double tuned parallel resonant circuit which has both the input and output connections at the primary side of the transformer to provide a positive curve of phase shift versus frequency.

A still further object of the invention is to provide a novel two terminal filter network having a negative phase versus frequency characteristic symmetrical about the resonant frequency.

These and other objects of the invention will become more fully apparent from the claims, and from the description as it proceeds in connection with the appended drawings wherein:

Figure 1:
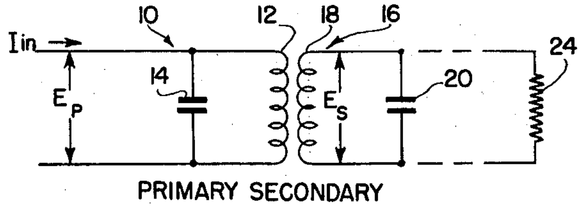
Figure 1 represents a conventional double tuned LC network.

Referring now to the drawings and specifically to Figure 1 where a conventional double tuned parallel LC network is illustrated, considering the primary circuit 10 alone an examination of the current flow in the primary circuit shows that at resonance the lagging current through inductance 12 and the leading current through capacitor 14 are equal and out of phase thereby neutralizing each other. The phase of the output voltage signal will then lead the network input current signal when the frequency is less than the resonant frequency and will lag when the frequency is greater than the resonant frequency.

Secondary circuit 16 may be similar to or even identical with primary circuit 10 and when circuits 10 and 16 are tuned to the same resonant frequency, the resulting behavior of the current and voltage in the two circuits depends very largely upon the degree of coupling between inductances 12 and 18. The degree of couplings may be considered as under coupled, critically coupled, or over coupled with the coefficient of critical coupling defined as $$K=\frac{1}{\sqrt{QpQs}}$$

where Q$p$ is the Q of the primary and Q$s$ is the Q of the secondary. The voltage level of the signal at resonance in secondary circuit 16 is maximum at critical coupling.

Figure 2:
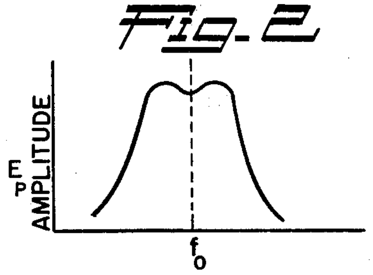
Figure 2 is a curve representing the signal amplitude on the primary of the circuit of Figure 1 as it varies with frequency.
Figure 3:
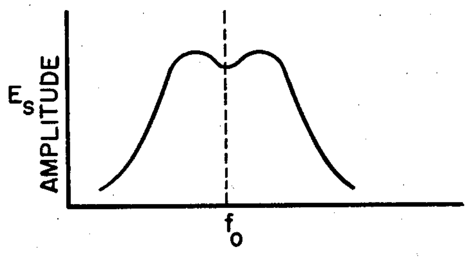
Figure 3 is a curve representing the signal amplitude on the secondary of the circuit of Figure 1 as it varies with frequency, and the coupling is over critical.

When the coefficient of coupling exceeds critical coupling the curve of voltage amplitude across capacitor 14 in primary circuit 10 as a function of frequency will exhibit the double peaked curve as shown in Figure 2. Under the same conditions, the curve of the voltage amplitude across capacitor 20 in the secondary circuit 16 will be similar, as shown in Figure 3.

Figure 4:
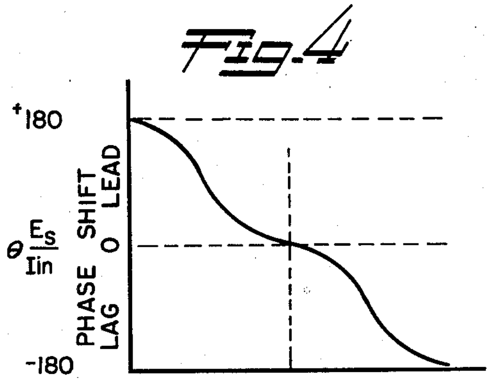
Figure 4 is a curve representing the phase of the signal on the secondary of the circuit of Figure 1 as it varies with frequency.

The curve representing the relative phase of voltage across the secondary capacitor 20 as a function of frequency is of the general shape shown in Figure 4 in which there is a phase lead for frequencies less than resonant frequency $f_0$, zero phase shift at the resonant frequency, and a lag for frequencies above the resonant frequency. The slope of the curve of Figure 4 representing the relative phase shift for different frequencies of the pass band is everywhere negative and it does not reverse. This is a common characteristic for nearly all conventional filter circuits.

Figure 5:
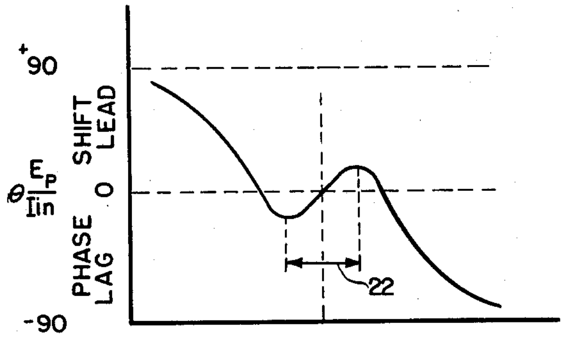
Figure 5 is a curve representing the phase of the signal on the primary of the circuit of Figure 1 as it varies with frequency.

Primary circuit 10 exhibits an entirely different phase behavior as shown in Figure 5 by the curve which represents the relative phase shift for different frequencies of the pass band. This phenomenon is evident in that the curve of Figure 5 crosses the zero phase shift axis at three points, indicating reversal or positive slope in the vicinity of the resonant frequency $f_0$. When the circuits are exactly critically coupled, all points in the vicinity of resonant frequency $f_0$ are on a line coincident with the axis of zero phase shift and the slope of section 22 of the curve of Figure 5 would be substantially horizontal. By increasing the coupling so that primary circuit 10 and secondary circuit 16 are over coupled, the positive slope of section 22 is increased. Furthermore, the degree of positive slope is substantially directly proportional to the degree of over coupling and by making the degree of over couple large the positive slope can be made quite large.

The positive slope of the section 22 of the curve shown in Figure 5 is due principally to the power drawn by secondary circuit 16 from primary circuit 10. By adding a resistive load 24 to secondary circuit 16 as shown in dotted lines in Figure 1, the points where the curve of Figure 5 cross the line of zero phase shift are altered.

Figure 6:
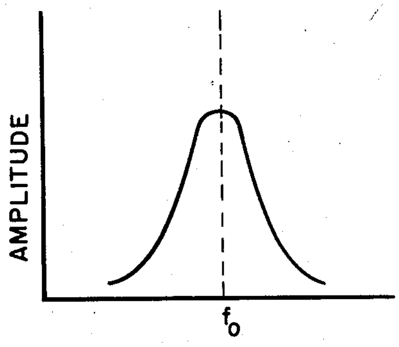
Figure 6 is a curve representing the signal amplitude from a single tuned circuit as it varies with frequency.

Conventional tuned circuits in general have a curve of relative phase shift for different frequencies of the pass band as a function of frequency similar to that of Figure 4. The curve showing the relative voltage amplitude across single tuned circuits as a function of frequency is a single peaked curve of the general type illustrated in Figure 6.

A four terminal network constructed in accordance with the present invention utilizes the foregoing principles by combining a conventional filter having a phase versus frequency curve of the type shown in Figure 4 with a filter section of the type having a phase versus frequency curve as illustrated in Figure 5. By proper construction of the filter having a phase versus frequency curve of the type shown in Figure 5, the slope of section 22 of that curve can be chosen, as by controlling the degree of over coupling between the primary and secondary circuits, so as to provide a zero relative phase shift for a band of frequencies the center of which is substantially $f_0$. Moreover, the amplitude of the signal from the combined sections can also be controlled to be substantially constant over the same band width.

The practical application of the present invention is in circuits where small distortions in phase are highly objectionable. For example in negative feedback loops in wide band amplifiers and in servo or other systems where the intelligence is in the phase domain, phase shifts of even small amounts cause serious distortions whereas in transmission systems where the intelligence is in the form of amplitude or frequency modulations such small phase shifts are generally unimportant. Thus the present invention is particularly useful where the intelligence is confined to a narrow band or is in the phase domain. In such systems, the amount of phase shift must be held to an absolute minimum and precision control of the phase shift is needed to provide an undistorted output signal.

A special application arises in connection with a position-indicating system disclosed in my co-pending application Serial No. 693,930, filed November 1, 1957, entitled Resolver Digitizing System. In this system, a resolver is employed to provide an output signal having a phase shift proportional to a physical displacement. The magnitude of the phase shift is electronically multiplied and subsequently digitized for display and/or further data processing. In this system the position of a continuously moving element of the resolver is recorded at selected intervals and if the transmission circuits employed in the system exhibit varying phase shift with frequency, there is a "velocity error" introduced any time a reading is taken while the resolver is in motion. The rate of change of phase shift indicates directly the velocity of the movable element in the resolver with respect to the fixed element as a doppler frequency. By utilizing four terminal networks in accordance with the present invention which incorporates phase correcting sections having positive phase shifts with changes in frequency, the negative phase shifts in conventional filters sections are neutralized and a flat phase response over the desired pass band is obtained.

Figure 7:
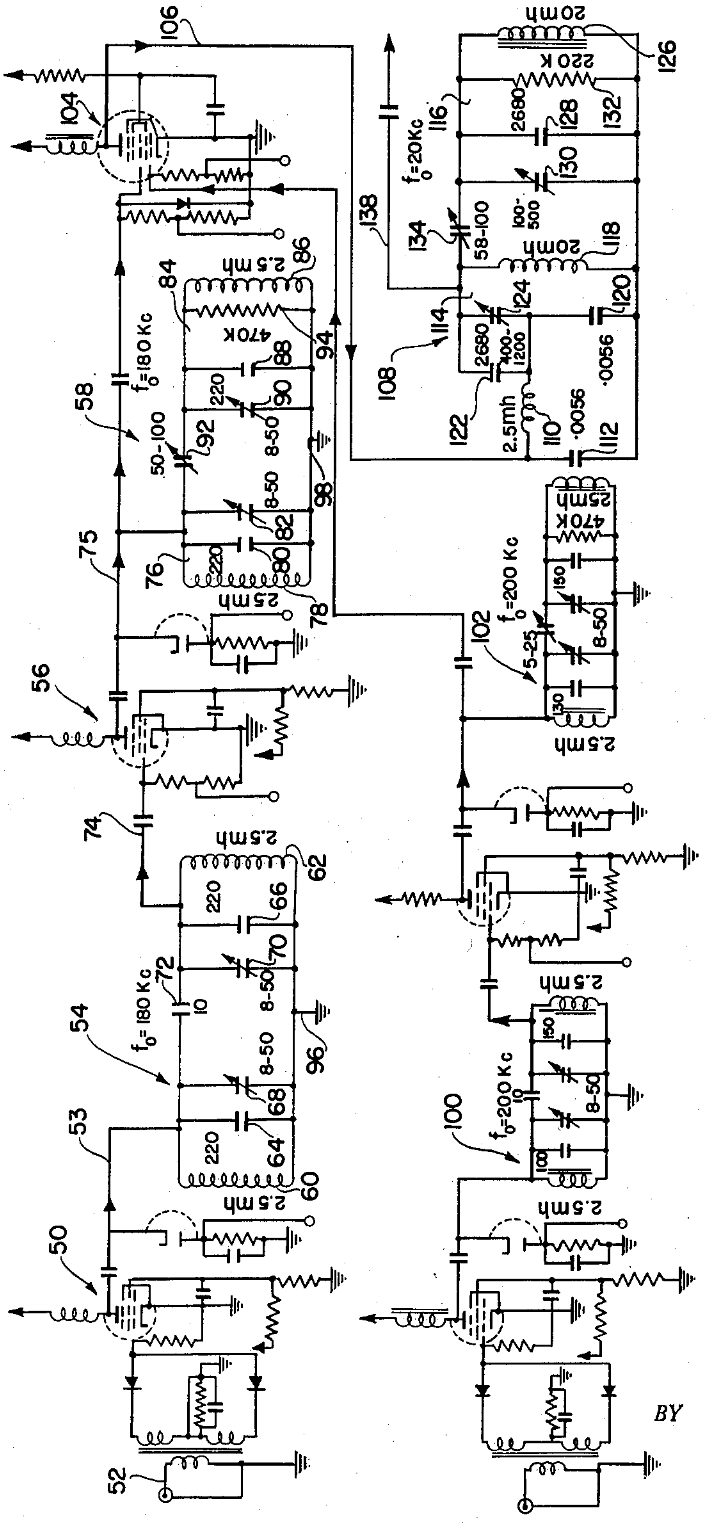
Figure 7 is a circuit diagram of part of a system in which the networks in accordance with the present invention are used.

Referring now to Figure 7, there is illustrated a circuit diagram of a small segment of the overall circuit used in the position indicating system as described in my above-identified co-pending application. An input signal is applied to amplifier 50 from terminal 52 and the amplifier output signal is applied on conductor 53 to a four terminal network comprising filter section 54, amplifier 56 and filter section 58. Filter section 54 comprises a double tuned LC network with inductances 60 and 62 coupled to provide a suitable band pass filter and each tuned to approximately the signal frequency of 180 kc. by fixed capacitors 64, 66 and variable capacitors 68, 70. A small coupling capacitor 72 may be used if desired, it being understood that either inductive or capacitive coupling may be used. This circuit has a phase versus frequency curve of the type shown in Figure 4 which has a negative slope.

The output signal is taken from the secondary circuit and applied by conductor 74 in a conventional manner to amplifier 56 and the output signal from amplifier 56 on lead 75 is applied to filter section 58 having a phase versus frequency curve of the type shown in Figure 5 which has a positive slope. Filter section 58 includes a primary tuned circuit 76 having inductance 78, fixed capacitor 80 and variable capacitor 82 and a secondary tuned circuit 84 having inductance 86, fixed capacitor 88 and variable capacitor 90. A small coupling capacitor 92 may be optionally used. The primary and secondary tuned circuits are each independently tuned to resonant frequency of 180 kc. and have a coefficient of coupling greater than critical. The secondary circuit also contains resistor 94 to provide a resistive load for drawing power from primary circuit 76 and only the primary circuit is connected to lead 75 as the output signal from filter 58 is effectively taken from primary circuit 76. Thus filter section 58 is effectively across the line rather than in series as is filter section 54.

The four terminals of the overall phase correcting network are lead 53, ground connection 96, lead 75, and ground connection 98.

A substantially identical signal channel is shown for a 200 kc. signal through filter sections 100 and 102. The 200 kc. signal and the 180 kc. signal are mixed in pentagrid convertor 104 and the difference frequency of 20 kc. is utilized as the desired signal on lead 106 and applied to four terminal network 108. Network 108 also has an overall relative zero phase shift and is accordingly an alternative form of the present invention.

Network 108 contains a first filter section including inductance 110 and capacitor 112, and is connected to the second filter section comprising a tuned primary circuit 114 and an over coupled tuned secondary circuit 116. Primary circuit 114 includes inductance 118, fixed capacitors 120, 122 and tuning capacitor 124 and a secondary circuit 116 includes inductance 126, fixed capacitors 128 and variable capacitor 130. Resistor 132 is provided to fix the desired Q of the secondary circuit and the primary and secondary circuits may, if desired, be coupled by capacitor 134. Primary and secondary circuits 114 and 116 are over coupled to provide the phase versus frequency curve having a positive slope as shown in Figure 5 to compensate for the negative slope of the corresponding curve for the filter composed of inductance 110 and capacitor 112. The output signal is on lead 138 which is connected to the primary circuit of second filter section and applied to the next stage in the system.

Figure 8:
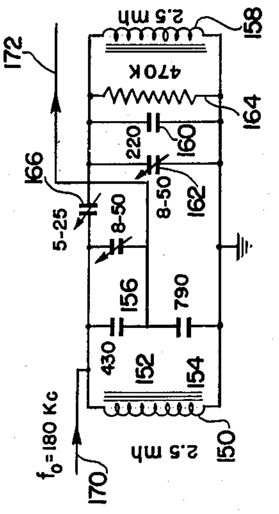
Figure 8 is a circuit diagram of a modified form of filter section where the curve of phase versus frequency has a positive slope.

Referring now to Figure 8, there is illustrated a further modified form of a filter section characterized by a phase versus frequency curve having a positive slope. This filter comprises a tuned primary circuit composed of inductance 150, fixed capacitors 152, 154 and variable capacitance 156 and a tuned secondary circuit composed of inductance 158, fixed capacitor 160, variable capacitor 162 and resistor 164. Coupling capacitor 166 may be provided if desired. The input signal is applied on lead 170 across capacitors 152 and 154 and the output signal is taken from the common connection between capacitors 152, 154 and 156 on lead 172. The primary and secondary circuits are over coupled and this filter section may be substituted for the corresponding filter section 58 of Figure 7.

Since there is a dip in amplitude at the resonant frequency across the primary of an over coupled double tuned circuit as shown in Figure 2, a composite filter or four terminal network combining the double tuned and single tuned sections as shown in Figure 7 provides both a substantially constant amplitude and constant phase response throughout the desired pass band. Suitable compromises can be made by adjusting parameter values and degree of coupling to achieve the exact desired amount of negative phase shift consistent with the allowable change in amplitude in the pass band. It should be noted that the pass band action can be controlled by adjusting the Q's of the circuits and the coefficient of coupling between the pair of over couple circuits. Also, toroidal coils may be used as the inductive reactances in these filters with coupling effected by means of one or more turns through the centers of the coupled toroids. Thus the degree of coupling can be easily adjusted and the circuits aligned to give the proper phase response.

The values of circuit parameters as shown in the drawing have been found to provide the desired operation and are to be considered exemplary and not limiting.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use in a system wherein intelligence is transmitted in the phase domain and confined to a narrow band of frequencies, a composite four terminal network comprising: a first section and a second section, said first section having means for producing a phase versus frequency curve having a positive slope over a selected band of frequencies, said second section having means for producing a phase versus frequency curve having a negative complementary slope over said selected band of frequencies, and means combining said first and second sections to provide an overall relative phase shift of zero for the selected band of frequencies.

2. The combination as defined in claim 1 wherein the first of said sections comprises an overcoupled double-tuned circuit.

3. For use in a system wherein intelligence is transmitted in the phase domain, a composite four terminal network comprising a first section having means for producing a phase versus frequency curve having a positive slope, a second section having means for producing a phase versus frequency curve having a negative complementary slope, the first of said sections comprising a pair of mutually coupled circuits, each of said circuits comprising a parallel inductance and capacitance tuned to the same frequency with said circuits being over-coupled and one of said circuits powered from the other of said circuits.

4. The network as defined in claim 3 wherein the input and output connections from said first section are both connected to said other of said circuits.

5. A composite four terminal network comprising a first filter section and a second filter section, each of said sections being tuned to the same resonant frequency, said first filter section having means for producing a phase versus frequency curve which increases with an increase of frequency over a region on each side of said resonant frequency, the second filter section having means for producing a phase versus frequency curve which correspondingly decreases with an increase of frequency over said region on each side of said resonant frequency, and means combining said first and second filter sections in said network to produce a substantially zero relative phase shift in said region of frequencies.

6. The combination as defined in claim 5 wherein the first of said filter sections comprises an over-coupled double-tuned parallel resonant LC circuit.

7. The combination as defined in claim 5 wherein the secondary of said double tuned circuit contains a parallel resistance and the input and output connections are both connected to the primary of said double tuned circuit.

8. The combination as defined in claim 7 wherein said second of said filter sections comprises a primary LC circuit tuned to the resonant frequency and a secondary LC circuit tuned to the resonant frequency with the coefficient of coupling between said circuits being less than critical.

9. The combination as defined in claim 7 wherein said second of said filter sections comprises a single tuned circuit.

10. In a composite network: A double tuned section and a single tuned filter section coupled together, one section having a positive slope of its phase versus frequency curve and the other section having a negative slope of its phase versus frequency curve, said single tuned filter section having a peak amplitude at the center frequency of the filter pass band equal to the amplitude of the peak on either side of the center frequency of the double tuned filter pass band, to provide a substantially constant amplitude and constant phase response throughout the pass band.

11. In combination: a filter having a primary circuit and a secondary circuit in coupled relationship for providing a phase shift in the leading direction for an increase of frequency over a band of frequencies on each side of resonant frequency, said primary circuit having a value of capacitance and a value of inductance required to tune said primary circuit to said resonant frequency, said secondary circuit having a value of capacitance and a value of inductance required to tune to said resonant frequency, the input to said primary circuit being a current signal and the output from said filter being a voltage signal taken across the primary circuit.

12. The combination as defined in claim 11 further having capacitive coupling between the primary and secondary circuits.

13. The combination as defined in claim 11 further having inductive coupling between the primary and secondary circuits.

14. A filter network providing a phase shift in the leading direction for an increase of frequency over a band of frequencies on each side of the resonant frequency comprising a primary circuit having an inductance and a capacitance in parallel and of a value required to tune to the resonant frequency and a secondary circuit in coupled relationship with said primary circuit, said secondary circuit having an inductance, a capacitance and a resistance in parallel and of a value required to tune to the resonant frequency, the coefficient of coupling between the primary circuit and the secondary circuit being greater than critical and means applying a current input signal to and taking a voltage output signal from said primary circuit.

15. The filter network as defined in claim 14 wherein the means applying input signals to and taking output signals from said primary circuit comprises the same terminals.

16. The network as defined in claim 14 wherein the capacitance in the primary circuit is provided by two capacitors connected in series and the last mentioned means applies input signals across both capacitors in series and the output signal is taken across only one of said capacitors.

References Cited in the file of this patent

UNITED STATES PATENTS

| | | |
|---|---|---|
| 513,370 | Steinmetz | Jan. 23, 1894 |
| 686,416 | Mordey | Nov. 12, 1901 |
| 1,129,231 | Rolinson et al. | Jan. 3, 1913 |
| 2,181,499 | Wheeler | Nov. 28, 1939 |
| 2,276,482 | Grundmann | Mar. 17, 1942 |
| 2,333,148 | Botsford | Nov. 2, 1943 |
| 2,383,984 | Oberweiser | Sept. 4, 1945 |
| 2,503,739 | Janssen | Apr. 11, 1950 |
| 2,623,945 | Wigan | Dec. 30, 1952 |
| 2,701,862 | Artzt | Feb. 8, 1955 |